United States Patent
Makelke et al.

(10) Patent No.: US 12,434,556 B2
(45) Date of Patent: Oct. 7, 2025

(54) FUEL TANK WITH FILLER NECK

(71) Applicant: MAGNA Energy Storage Systems GmbH Werk Schwäbisch Gmünd, Schwäbisch Gmünd (DE)

(72) Inventors: Benjamin Makelke, Bargau (DE); Harry Wiese, Moegglingen (DE); Steffen Zanek, Schwäbisch Gmünd (DE)

(73) Assignee: MAGNA Energy Storage Systems GmbH Werk Schwäbisch Gmünd, Schwäbisch Gmünd (DE)

( * ) Notice: Subject to any disclaimer, the term of this patent is extended or adjusted under 35 U.S.C. 154(b) by 119 days.

(21) Appl. No.: 18/335,321

(22) Filed: Jun. 15, 2023

(65) Prior Publication Data
US 2024/0416745 A1    Dec. 19, 2024

(51) Int. Cl.
B60K 15/04    (2006.01)

(52) U.S. Cl.
CPC ........ B60K 15/04 (2013.01); *B60K 2015/047* (2013.01); *B60K 2015/0477* (2013.01)

(58) Field of Classification Search
CPC ...... B60K 2015/0477; B60K 2015/047; B65D 2501/0081; B65D 1/023
USPC .............................. 220/905, 4.12–4.14, 562
See application file for complete search history.

(56) References Cited

U.S. PATENT DOCUMENTS

| | | | | |
|---|---|---|---|---|
| 2,779,498 A | * | 1/1957 | Cole | F16L 41/088 285/141.1 |
| 4,759,459 A | * | 7/1988 | Bailey | B60K 15/04 220/601 |
| 5,415,316 A | * | 5/1995 | Pemberton | B60K 15/03177 220/62.18 |
| 7,059,187 B2 | * | 6/2006 | Clarke, III | B63B 25/12 264/516 |
| 11,371,409 B2 | * | 6/2022 | Fellman | F01N 3/2066 |
| 2014/0026990 A1 | * | 1/2014 | Delihas | F17D 3/01 137/558 |
| 2015/0184803 A1 | * | 7/2015 | Jarzynski | B60K 15/07 220/4.01 |
| 2022/0212739 A1 | * | 7/2022 | Tokunaga | B60K 15/04 |

(Continued)

FOREIGN PATENT DOCUMENTS

KR    200148139 Y1 *    6/1999    .............. B60K 15/04

OTHER PUBLICATIONS

Translation of KR 200148139 Y1 (Year: 1999).*

*Primary Examiner* — Mollie Impink
(74) *Attorney, Agent, or Firm* — Jordan IP Law, LLC; Todd A. Vaughn

(57) ABSTRACT

A fuel tank for a motor vehicle. The fuel tank includes a tank having an external casing having an opening and a forming zone in a region about the opening, the forming zone having a first forming zone region that is deformed in comparison to a shape of the external casing surrounding the forming zone and a second forming zone region on a periphery of the opening that is deformed greater than the deformation in the first forming zone region. The fuel tank also includes a filler neck for filling the tank, the filler neck leading into an opening of the external casing and being welded to the external casing by way of a weld seam that is accessible from outside the tank, the filler neck in the region of the opening being deformed greater than the deformation than the deformation of the second forming zone region.

5 Claims, 1 Drawing Sheet

(56) References Cited

U.S. PATENT DOCUMENTS

2024/0181868 A1\* 6/2024 Zanek ................ B60K 15/03
2024/0183302 A1\* 6/2024 Zhu ................ F01N 13/1861

\* cited by examiner

FUEL TANK WITH FILLER NECK

TECHNICAL FIELD

Embodiments relate to a fuel tank for a motor vehicle, the fuel tank comprising a tank having an outer casing of the tank and a filler neck for filling the tank.

BACKGROUND

It is well known that motor vehicles use fuel tanks for carrying onboard the fuel, for example petrol or diesel, required for the drive. The tank of such a fuel tank has an external casing which represents the outward delimitation and largely absorbs forces which act externally on the fuel tank. The external casing can simultaneously also delimit the tank volume on the inside, or a dedicated inner tank may be provided. A filler neck, which is known per se and leads from the space outside the tank through an opening of the tank, serves for filling the tank.

Fuel tanks of this type must meet various requirements, some of which are statutory. For example, the fuel tanks must be constructed so that the risk of a fuel leakage in the event of an accident is as minor as possible, and must therefore also pass statutory drop tests.

SUMMARY

Embodiments relate to a fuel tank for a motor vehicle which poses a minor risk of fuel leakage in the event of an accident and at the same time can be manufactured in a simple and cost-effective manner.

In accordance with one or more embodiments, a fuel tank for a motor vehicle comprises a tank having an external casing of the tank and a filler neck for filling the tank, wherein the filler neck leads into an opening of the external casing, wherein the external casing in the region about the opening has a forming zone which is deformed in comparison to the shape of the external casing surrounding the forming zone, wherein the forming zone on the periphery of the opening is even more heavily formed/deformed, in particular flanged, wherein the filler neck in the region of the even more heavily formed/deformed, in particular flanged, periphery is welded to the external casing by way of a weld seam that is accessible from outside the tank.

In accordance with one or more embodiments, a filler neck is configured in the region of forming, thus in a forming zone, which is deformed in particular in the direction towards the interior or exterior of the tank. As a result, the safety in the entry region of the filler neck into the tank is enhanced by the surrounding walls of the external casing. The advantageous shape is formed by simple forming, in particular embossing. The forming zone is formed integrally by the external casing. Additional components such as a flange, for example, are not required to this end.

Inward forming of the periphery of the opening, in particular, an inward flange, makes it possible for the filler neck to be fastened in a reliable and simple manner to the external casing of the tank from the outside. To this end, a weld seam can be produced in a simple manner from the outside. In this way, the quality of the welding can be established and also improved, if necessary, in a simple manner from the outside.

If the tank is dropped, for example, this construction causes less damage in the region of the attachment of the filler neck and to the fuel tank overall.

In accordance with one or more embodiments, the forming zone substantially forms a plane which in comparison to the convex shape of the external casing surrounding the forming zone is deformed, preferably towards the interior or towards the exterior of the tank. The forming region, in particular, the plane, can preferably have the approximate shape of an ellipse, of an oblong hole, or of a circle.

In accordance with one or more embodiments, the external casing preferably has essentially the shape of a cuboid with radiused longitudinal edge regions, wherein the forming zone is configured in a radiused longitudinal edge region. A lateral edge of the cuboid that extends along the length of the cuboid is thus at least in portions not configured as an edge on an orthogonal transition between two lateral faces, but has a significantly radiused finish. The forming zone, and thus also the filler neck, are configured in the region of this radiused finish on the edge. The region on the periphery of the opening that is even more heavily formed/deformed, specifically flanged inwards or flanged outwards, preferably forms a flange of which the ends run parallel to the filler neck towards the tank interior or towards the tank exterior.

The filler neck on the end thereof that lies outside the external casing preferably has an external thread or a bayonet fastener or similar, in particular for closing the filler neck with a cap.

DRAWINGS

Embodiments will be illustrated by way of example in the drawings and explained in the description hereinbelow.

DESCRIPTION

Figure 2:
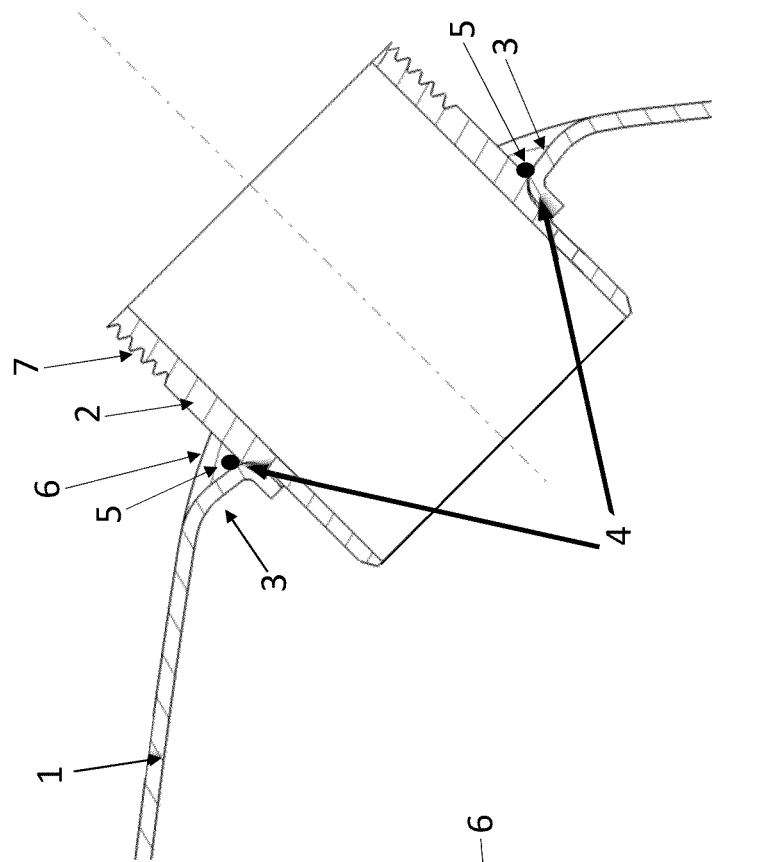
FIG. 2 illustrates a sectional view of the fuel tank of FIG. 1, in a section on a normal plane to the longitudinal extent of the tank at the central axis of the filler neck.
Figure 1:
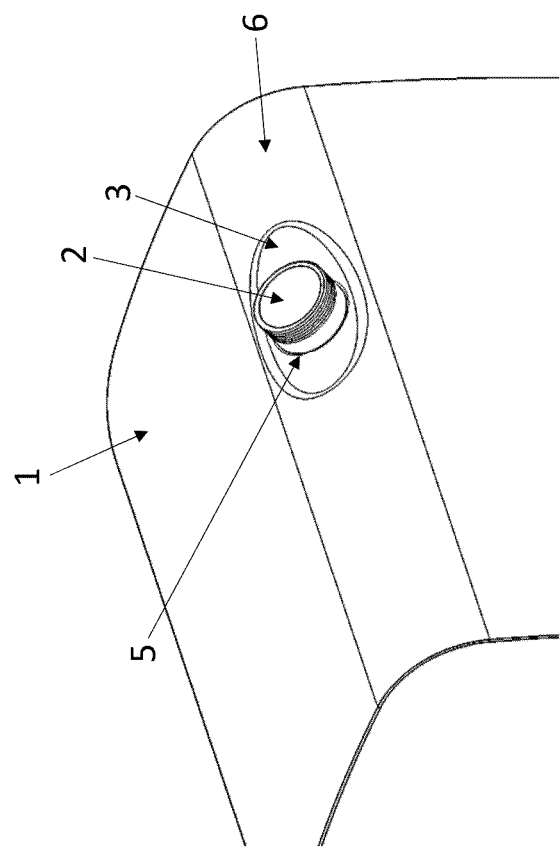
FIG. 1 illustrates a three-dimensional illustration of a fuel tank in the region of the filler neck, in accordance with one or more embodiments.

A fuel tank according to the invention in the region of the filler neck is illustrated in a three-dimensional manner in FIG. 1, and the region about the filler neck is illustrated in a section in FIG. 2.

The tank of the fuel tank has an external casing 1 which substantially has the shape of a cuboid with radiused longitudinal edge regions 6. A forming zone 3 is configured in one of the radiused longitudinal edge regions 6.

The forming zone 3 in comparison to the shape of the external casing 1 surrounding the forming zone 3 is deformed towards the interior of the tank. The forming zone 3 substantially forms a plane which in comparison to the convex shape of the external casing 1 surrounding the forming zone 3, specifically in comparison to the remaining shape of the longitudinal edge region 6, is deformed towards the interior of the tank. The forming zone 3 can be inwardly offset in comparison to the surrounding shape of the external casing 1, in particular in comparison to the remaining shape of the longitudinal edge region 6, and/or form a concavity towards the interior.

A filler neck 2 for filling the tank leads into an opening of the external casing 1, the latter preferably being disposed in the center of the forming zone 3.

As illustrated in FIG. 2, the forming zone 3 on the periphery of the opening is even more heavily formed/deformed towards the interior, in particular flanged 4 towards the interior, thus having an inward flange 4 which forms the periphery of the opening for the filler neck 2. The filler neck 2 in the region of the even more heavily formed/deformed, in particular flanged 4, periphery of the opening is welded to the external casing 1 by way of a weld seam 5 that is accessible from the outside, thus from the exterior of the tank, and circumferentially encircles the opening.

The ends of the external casing 1 that form the inward flange 4 extend parallel to the filler neck 2 towards the inside, thus towards the interior of the tank. The filler neck 2 on the end thereof that lies outside the external casing 1 has an external thread 7, in particular for closing the filler neck 2 with a cap.

In accordance with one or more embodiments, the required geometry at the interface, specifically the forming zone 3, is thus implemented directly by way of the existing components of the tank, specifically by way of the external casing 1 of the tank, by means of forming said existing components. The forming may have various geometries. No additional material is used in the process. Only external welding of the filler neck 2 to the external casing 1 is additionally performed, thus the application of a weld seam 5. The inward flange 4 into the interior of the tank ensures positive positioning of the filler neck 2, thus also an improved distribution of force in terms of the statutory drop test.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 External casing
2 Filler neck
3 Forming zone
4 Inward flange
5 Weld seam
6 Longitudinal edge region
7 External thread

What is claimed is:

1. A fuel tank for a motor vehicle, the fuel tank comprising:
    a tank having an external casing with an opening into an interior of the tank,
    a deformed zone surrounding the opening, the zone formed by embossing a region of the external casing such that the zone is concavely recessed toward the tank interior and inwardly flanged at the opening;
    a filler neck inserted into the opening of the external casing such that an inserted end of the filler neck is in contact with a surface of the flange; and
    the flange is welded to the deformed zone via a weld seam that is accessible from the tank exterior and circumferentially encircles the opening.

2. The fuel tank of claim 1, wherein the external casing substantially has a cuboid shape with radiused longitudinal edge regions.

3. The fuel tank of claim 2, wherein the deformed zone is within one of the radiused longitudinal edge regions.

4. The fuel tank of claim 1, wherein the inward flange and the inserted end of the filler neck are concentric.

5. The fuel tank of claim 1, wherein the filler neck, on an end thereof that lies outside the external casing, has a closure region for closing the filler neck with a cap.

* * * * *